US008481125B2

(12) United States Patent
Yi et al.

(10) Patent No.: US 8,481,125 B2
(45) Date of Patent: Jul. 9, 2013

(54) MITIGATION OF BIOMOLECULAR ADSORPTION WITH HYDROPHILIC POLYMER ADDITIVES

(75) Inventors: Uichong B. Yi, Cary, NC (US); Peter-Patrick De Guzman, Orange, CA (US); Wayne Po-Wen Liu, Los Angeles, CA (US)

(73) Assignee: Advanced Liquid Logic Inc., Research Triangle Park, NC (US)

( * ) Notice: Subject to any disclaimer, the term of this patent is extended or adjusted under 35 U.S.C. 154(b) by 456 days.

(21) Appl. No.: 11/915,308

(22) PCT Filed: May 18, 2006

(86) PCT No.: PCT/US2006/019425
§ 371 (c)(1),
(2), (4) Date: Nov. 21, 2007

(87) PCT Pub. No.: WO2006/127451
PCT Pub. Date: Nov. 30, 2006

(65) Prior Publication Data
US 2009/0280251 A1    Nov. 12, 2009

Related U.S. Application Data

(60) Provisional application No. 60/683,476, filed on May 21, 2005.

(51) Int. Cl.
*B05D 3/10* (2006.01)
(52) U.S. Cl.
USPC ........ 427/427.4; 204/454; 204/601; 427/230; 427/299; 427/302; 427/337; 427/421.1; 428/36.9
(58) Field of Classification Search
USPC ........... 427/299, 230, 302, 337, 421.1, 427.4; 204/454, 601; 428/36.9
See application file for complete search history.

(56) References Cited

U.S. PATENT DOCUMENTS

| | | | |
|---|---|---|---|
| 5,240,994 A | 8/1993 | Brink et al. | |
| 6,596,238 B1 | 7/2003 | Belder et al. | |
| 6,613,560 B1 | 9/2003 | Tso et al. | |
| 6,924,792 B1 | 8/2005 | Jessop | |
| 7,251,392 B2 | 7/2007 | Kuiper et al. | |
| 7,267,752 B2 | 9/2007 | King et al. | |
| 7,310,080 B2 | 12/2007 | Jessop | |
| 7,454,988 B2 | 11/2008 | Tan | |
| 7,547,380 B2 | 6/2009 | Velev | |
| 7,821,699 B1 | 10/2010 | Lo et al. | |
| 2002/0125135 A1* | 9/2002 | Derand et al. | 204/454 |
| 2005/0142563 A1* | 6/2005 | Haddad et al. | 435/6 |
| 2006/0132927 A1 | 6/2006 | Yoon | |

OTHER PUBLICATIONS

Yoon et al. "Preventing Biomolecular Adsorption in Electrowetting-Based Biofluidic Chips". Anal. Chem. 75, 5097-5102 (2003).*

Jie Ding, "System level architectural optimization of semi-reconfigurable microfluidic system," M.S. Thesis, Duke University Dept of Electrical Engineering, 2000.
Moon, Hyejin, Ph.D., "Electrowetting-on-dielectric microfluidics: Modeling, physics, and Maldi application," University of California, Los Angeles, 2005.
Fair, et al., "Integrated chemical/biochemical sample collection, pre-concentration, and analysis on a digital microfluidic lab-on-a-chip platform," Lab-on-a-Chip: Platforms, Devices, and Applications, Conf. 5591, SPIE Optics East, Philadelphia, Oct. 25-28, 2004.
Terry, S.C., J.H. Jerman, and J.B. Angell, "A Gas Chromatographic Air Analyzer Fabricated on a Silicon Wafer," IEEE Transactions on Electron Devices, vol. ED-26, 1979, pp. 1880-1886.
Tuckerman, D.B. and R.F.W. Pease, "High-Performance Heat Sinking for VLSI, "IEEE Electron Device Letters, 1981, pp. 126-129.
Batchelder, J.S., "Dielectrophoretic manipulator," Review of Scientific Instruments, vol. 54, 1983, pp. 300-302.
Manz, A., N. Graber, and H.M. Widmer, "Miniaturized Total Chemical Analysis Systems: A Novel Concept for Chemical Sensing," Sensors and Actuators B: Chemical, 1990, pp. 244-248.
Welters, W.J.J. and L.G.J. Fokkink, "Fast Electrically Switchable Capillary Effects," Langmuir, vol. 14, Mar. 1998, pp. 1535-1538.
McDonald, J.C., D.C. Duffy, J.R. Anderson, D.T. Chiu, H. Wu, O.J.A. Schuueller, and G.M. Whitesides, "Fabrication of Microfluidic systems in poly (dimethylsiloxane)," Electrophoresis, vol. 21, 2000, pp. 27-40.
A. Wego, S. Richter, L. Pagel, "Fluidic microsystems based on printed circuit board technology," Journal of Micromechanics and Microengineering, vol. 11, No. 5, pp. 528-531 (Sep. 2001).
Moon H, Cho SK, Garrell RL, et al., "Low voltage electrowetting-on-dielectric," Journal of Applied Physics, vol. 92 (7): pp. 4080-4087, Oct. 1, 2002.
Locascio, L.E., et al. "Polymer microfluidic devices," Talanta, vol. 56, Feb. 2002, pp. 267-287.
Garrell, R.L. et al., "Preventing Biomolecular Adsorption in Electrowetting-Based Biofluidic Chips," Analytical Chemistry, vol. 75, Oct. 2003, pp. 5097-5102.

(Continued)

*Primary Examiner* — Michael Cleveland
*Assistant Examiner* — Alexander Weddle
(74) *Attorney, Agent, or Firm* — William A. Barrett; Ward and Smith, P.A.

(57) ABSTRACT

Molecular adsorption to the microfluidic device surfaces can be passively and actively mitigated by mixing certain hydrophilic polymers (organic polymers with repeating hydrophilic groups—the preferred polymers being amphipathic surfactants—with the sample liquid during or prior to relevant microfluidic operations. Nonionic surfactants such as polyoxyethylene sorbitan monooleate and polyoxyethylene octyl phenyl ether are especially effective. High molecular weight polyethylene polymers are also effective. The hydrophilic polymers appear to prevent binding of the fouling molecules to the microfluidic by occupying the surface sites in place of the fouling molecules or by interacting with the fouling molecules to prevent binding of the fouling molecules the surface. When surface adsorption is thus mitigated, microfluidic devices can readily handle samples containing biomolecules to enable active sample concentration, filtering, washing, transport, mixing and other sample handling operations.

15 Claims, No Drawings

OTHER PUBLICATIONS

P.Y. Chiou, H. Moon, H. Toshiyoshi, C.-J. Kim, and M.C. Wu, "Light actuation of liquid by optoelectrowetting," Sensors and Actuators A: Physical, vol. 104, May 2003, pp. 222-228.

Squires, T.M. and S.R. Quake, "Microfluidics: Fluid physics at the nanoliter scale," Reviews of Modern Physics, vol. 77, Oct. 2005, pp. 977-1-977-26.

Fouillet, Y., D. Jary, A.G. Brachet, C. Chabrol, J. Boutet, P. Clementz, R. Charles, and C. Peponnet, "Design and Validation of a Complex Generic Fluidic Microprocessor Based on EWOD Droplet for Biological Applications," 9th International Conference on Miniaturized Systems for Chemistry and Life Sciences (MicroTAS), Boston, MA: 2005, pp. 58-60.

Z. Guttenberg, H. Muller, H. Habermuller, A. Geisbauer, J. Pipper, J. Felbel, M. Kielpinski, J. Scriba, and A. Wixforth, "Planar chip devices for PCR and hybridization with surface acoustic wave pump," Lab on a chip, vol. 5, Mar. 2005, pp. 12617-12622.

Yager, P., T. Edwards, E. Fu, K. Helton, K. Nelson, M.R. Tam, and B.H. Weigl, "Microfluidic diagnostic technologies for global public health," Nature, vol. 442, 2006, pp. 412-418.

Cooney, C.G., C-Y. Chen, M.R. Emerling, A Nadim, and J.D. Sterling, Microfluidics and Nanofluidics, vol. 2 Mar. 2006, pp. 435-446.

Chatterjee, D., B. Hetayothin, A.R. Wheeler, D.J. King, and R.L. Garrell, "Droplet-based microfluidics with nonaqueous solvents and solutions.," Lab on a Chip, vol. 6, Feb. 2006, pp. 199-206.

M.Madou, J. Zoval, G. Jia, H. Kido, J. Kim, "Lab on a CD," Annual Review of Biomedical Engineering, vol. 8, pp. 601-628, 2006.

Yi, U.-C. and C.-J. Kim, "Characterization of electrowetting actuation on addressable single-side coplanar electrodes," Journal of Micromechanics and Microengineering, vol. 16, Oct. 2006, pp. 2053-2059.

Dubois, P., G. Marchand, Y. Fouillet, J. Berthier, T. Douki, F. Hassine, S. Gmouh, and M. Vaultier, "Ionic Liquid Droplet as e-Microreactor," Analytical Chemistry, vol. 78, 2006, pp. 4909-4917.

Whitesides, G.M., "The origins and the future of microfluidics," Nature, vol. 442, 2006, pp. 368-373.

Chin, C.D., V. Linder, and S.K. Sia, "Lab-on-a-chip devices for global health: past studies and future opportunities.," Lab on a Chip, vol. 7, Jan. 2007, pp. 41-57.

Baviere, R., J. Boutet, and Y. Fouillet, "Dynamics of droplet transport induced by electrowetting actuation," Microfluidics and Nanofluidics, vol. 4, May. 2007, pp. 287-294.

* cited by examiner

MITIGATION OF BIOMOLECULAR ADSORPTION WITH HYDROPHILIC POLYMER ADDITIVES

CROSS-REFERENCE TO PRIOR APPLICATIONS

The present applications claims the benefit of U.S. Provisional Application 60/683,476 file on May 21, 2005; the contents of which are incorporated by reference to the extent permitted by law.

GRANT INFORMATION

This invention was made with government support under DMI-0320082 awarded by the National Science Foundation. The government has certain rights in the invention.

BACKGROUND OF THE INVENTION

1. Area of the Art

The present invention concerns the art of fluidics and particularly microfluidics.

2. Description of the Background Art

Microfluidics involves miniature fluid devices; the art is often defined as the art of dealing with small fluidic volumes (sub-milliliter volumes) typically in channels having at least one dimension less than one millimeter. Of course, this definition is flexible and the present invention can be useful in devices with different configurations and different sizes. In fact, there are microfluidic devices having no confinement channels at all. Typical microfluidic devices have micromechanical structures (microchannel, microvalves and others) and employ various fluid-moving means, such as mechanical parts (e.g., micropumps) hydro-pneumatic devices/methods and electrically-based effects (electrophoretic, dielectrophoretic, electro-osmotic, electrowetting, opto-electrowetting, variations of these effects as well as other effects).

For biomedical applications, some microfluidic devices are designed to conduct sample processing, including concentration, filtration, washing, dispensing, mixing, transport, sample splitting, sample lysing and other sample handling functions. Biomolecular adsorption is a problem for microfluidic devices in that the surfaces that are exposed to the sample liquids during sample handling, processing or sensing can become "fouled" by the adsorption of various biomolecules. Changes in surface properties due to unwanted surface adsorption of biomolecules can lead to cross contamination, loss of target molecules availability for sensing, degradation of sensing surfaces, and/or degradation in the passive and active control of surface effects, valving and other mechanical effects needed for sample processing.

One established method of mitigating biomolecular adsorption is to pretreat or coat the surface of the microfluidic device with a blocking agent prior to sample handling. For example, "Pegylation" involves the precoating of microfluidic surfaces with Poly-Ethylene-Glycol (PEG) to block non-specific adsorption during sample handling. Reactive derivatives of PEG can be used to ensure covalent bonding to the surface. Additional blocking agents include a variety of generally hydrophilic substances including large molecules like common proteins as well as smaller molecules which can include carboxylic acid derivatives, carbohydrates and even silicon containing compounds. While surfaces can be "Pegylated" (including treatment with other blocking agents) through passive absorption of the blocking agent, it is generally preferred to effect a covalent linkage of the blocking agent and the surface.

One possible drawback of pretreatment or pre-coating a microfluidic device to prevent non-specific binding is that such a treatment leads to permanent changes in the surface characteristics and may impede active control over surface effects (adsorption, wettability, etc.) needed to achieve local and intermittent sample processing effects. Another drawback to precoating with blocking agents is that a specific blocking agent or surface coating may be required for a particular sample liquid or molecule, thus rendering the device unusable for other sample molecules or sample liquid formulations.

SUMMARY OF THE INVENTION

As might be expected, different types of molecules have different tendencies to foul fluidic surfaces. Generally, proteins and other constituents of biological samples (i.e., "biomolecules") are unusually effective at fouling. We have discovered that molecular adsorption to the microfluidic device surfaces can be passively and actively mitigated by mixing certain hydrophilic polymers with the sample liquid prior to relevant operations. By "hydrophilic polymer" we mean organic polymers of repeating monomers containing hydrophilic groups such as hydroxyl groups; the preferred polymers are amphipathic and have at least some surfactant properties—that is, the ability to lower surface tension and/or interact with both hydrophobic and hydrophilic substances. It is believed that the effective hydrophilic polymers prevent binding of the fouling molecules to the surfaces found in many types of microfluidic devices perhaps by occupying the surface sites in place of the fouling molecules or by interacting with the fouling molecules to prevent their binding to the surface.

In some cases the hydrophilic polymers may be temporarily and locally concentrated at the surface due to actively induced surface charges. This concentration occurs with either charged polymers or with polymers having sufficient dipole moment to respond to the induced charge. The presence of the hydrophilic polymer at or near the surface may prevent or screen the fouling molecule from subsequently interacting with the surface. When surface adsorption is thus mitigated, microfluidic devices can readily handle samples containing biomolecules to enable active sample concentration, filtering, washing, transport, mixing and other sample handling operations. A preferred method of mitigation is to actually add the hydrophilic polymer to the sample liquid. In that situation the hydrophilic polymer molecules may directly interact with or otherwise screen the fouling molecule and prevent its binding to the surface. In some situations brief pretreatment will prevent or mitigate fouling without the permanent change in surface characteristics seen with traditional surface coating technology.

Successful mitigation of fouling by molecular adsorption in microfluidic devices can be achieved with a broad range of hydrophilic polymers and polymeric surfactants—particularly nonionic ones including (but not limited to) pluronic surfactants, polyethylene glycol (PEG), methoxypolyethylene glycol (MPEG), poly-sorbate (polyoxyethylene sorbitan monooleates or Tween®), polyoxyethylene octyl phenyl ether (Triton X-100®), polyvinyl pyrollidone, polyacrylic acid (and crosslinked polyacrylic acid such as carbomer), polyglycosides (nonionic glycosidic surfactants such as octyl glucopyranoside) and soluble polysaccharides (and derivatives thereof such as heparin, dextrans, methyl cellulose, propyl methyl cellulose (and other cellulose esters and ethers), dextrins, maltodextrins, galactomannans, arabinogalactans, beta glucans, alginates, agar, carrageenan, and plant gums such as xanthan gum, psyllium, guar gum, gum traganth, gum karya, gum ghatti and gum acacia. The particular additive can be selected for maximum compatibility with a specific microfluidic sample. The weight by volume concentration of these additives needed to mitigate surface fouling can range from below 0.01% to over 25% (weight by volume) in the case of the less viscous polymers. Amphipathic molecules appear to be the most effective hydrophilic polymers. The range of the degree of polymerization (i.e., the number of monomers per average polymer chain) is also quite broad: molecular weights of these additives can also range from several hundred to tens of thousands. We have found that mitigation of surface fouling can be sensitive to the particular molecular weight (MW), concentration or type of hydrophilic polymer additive. For example, higher molecular weight polymers can be significantly more effective than lower molecular weight polymers of the same monomer composition. While most tests have been done using a single hydrophilic polymer, mixtures of several polymers are also effective and may show special advantages.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a method to prevent fouling of surfaces in microfluidic devices.

Experimental Results

An example of how this inventive system allows microfluidic sample processing despite the presence of "fouling" agents has been made using a set of microfluidic devices that conduct Electrowetting-on-Dielectric (EWOD) based droplet driving [see 1) J. Lee, H. Moon, J. Fowler, T. Schoellhammer and C.-J. Kim, "Electrowetting and Electrowetting-On-Dielectric for Microscale Liquid Handling", Sensors and Actuators, Vol. A95, 2002, pp. 259-268 and 2) S.-K. Cho, H. Moon and C.-J. Kim, "Creating, Transporting, Cutting, and Merging Liquid Droplets by Electrowetting-Based Actuation for Digital Microfluidic Circuits", Journal of Microelectromechanical Systems, Vol. 12, 2003, pp. 70-80 for background on EWOD]. EWOD has been used for the test for at least two reasons: 1) EWOD is exquisitely sensitive to surface properties so that fouling effects can be easily detected without resort to radioactive compounds, etc.; and 2) EWOD is extremely useful in many microfluidic applications but because of its sensitivity cannot readily be used with many biological molecule (at least not without the present invention). It should be appreciated that once an EWOD surface has been fouled it can be extremely difficult or even essentially impossible to regain proper operation of the device. EWOD is one of a number of related electrowetting mechanism. By electrowetting mechanism we mean the use of an electrowetting method to manipulate and move fluid droplets.

Several different biomolecules have been used as experimental fouling agents. The water soluble globular protein Horse Radish-Peroxidase (HRP) (MW 40,000) is used in many diagnostic processes that are amenable to EWOD automation, but unfortunately it is an extremely effective fouling agent. So, here we chose to use HRP to demonstrate the present invention in an EWOD setting. As a control a 25 µl droplet of HRP (1.0 units/ml≈0.1 mg/ml) in PBS (phosphate buffered saline) was deposited on the active surface of an EWOD device. A variety of DC and AC driving voltages (20 to 100 volts rms) and driving frequencies (10 to 10,000 Hz) were then applied in an attempt to move the droplet. No droplet transport was observed, thereby verifying the potency of HRP as a fouling agent. Polyethylene glycol (PEG) (MW=3,300) at 0.01% w/v was added to the HRP in PBS solution. A 25 µl droplet of this PEG/HRP solution was then deposited on the EWOD device. The same driving voltage parameters were then applied. Rapid droplet transport was observed and repeatedly conducted over a preprogrammed path. This shows that a small quantity of PEG can overcome HRP fouling and permit HRP containing samples to be processed by a microfluidic device by means of EWOD.

It will be appreciated that extremely low concentrations of a fouling agent such as HRP are capable of preventing the usual EWOD effect. Since similar proteins are likely to be found in almost any use of EWOD involving biological samples, the ability of the invention to overcome this problem extends the usefulness of EWOD manipulations into a broad range of diagnostic and biotechnology applications. Similarly, the inventive addition of the effective hydrophilic polymers to other microfluidic devices readily prevents molecular fouling without the complexity and drawbacks of permanent surface coatings.

Additional experiments were conducted to explore the influence of polymer size (i.e., MW of polymer). The EWOD conditions as above were used, but a different fouling agent was substituted. In these experiments variable concentrations of Bovine Serum Albumin (BSA) were used with a minimum concentration of only 50 µg/ml (that is about half the weight of HRP used above). BSA is a globular protein with a molecular weight of around 67,000 and is used in many biochemical experiments as a protein protective agent. Also, it is a reasonable model for human serum albumin which will be present in tests involving human blood and many other human fluids. Thus, it is very important to overcome fouling caused by albumin. Because of its higher molecular weight and lower experimental concentration fewer molecules of BSA are present than the HRP molecules in the previous experiment—this merely highlights the effectiveness of BSA as a fouling agent. A series of experiments were undertaken to determine the concentration of various PEG polymers that were effective to overcome the negative effects of different concentrations of BSA.

In the experiments test solutions were made up consisting of different concentrations of BSA with different PEG concentrations as specified in Table 1. The conditions were otherwise the same as in the HRP experiment and 25 µl droplets of each test solution were subjected to attempted EWOD movement. The table indicates the PEG concentration needed to overcome a particular concentration of BSA—that is to permit the BSA containing droplet to be moved by EWOD.

TABLE 1

Concentrations of PEG needed to overcome various concentrations of BSA for various molecular sizes of PEG polymer

| BSA Concentration | 50 µg/ml | 100 µg/ml | 200 µg/ml | 300 µg/ml |
|---|---|---|---|---|
| Minimum Effective PEG 400 Conc. | 10 wt./v % | 20 wt./v % | 30 wt/v % | 35 wt./v % |
| Minimum Effective PEG 3350 Conc. | 0.1 wt./v % | 0.5 wt./v % | 1.0 wt./v % | 1.0 wt./v % |
| Minimum Effective PEG 6000 Conc. | 0.01 wt./v % | 0.1 wt./v % | 0.1 wt./v % | 1.0 wt./v % |

These results show a significant and somewhat surprising relationship between polymer length or size (MW) and effectiveness. With a PEG polymer the larger the polymer, the more effective the antifouling effect. Thus, at a BSA concentration of 50 µg/ml increasing the polymer MW from 400 to 6000 decreases the required concentration of PEG from 10% to 0.01% (by weight). This relationship is fortuitous in that higher MW polymers tend to be more viscous but the greatly increased efficacy avoids any problem of excess viscosity. With a given MW polymer there is a rough relationship between the amount of BSA and the effective amount of PEG. With 400 MW PEG doubling the BSA concentration requires a doubling of PEG at the low concentration end of the series. At higher concentration of BSA a smaller increase of PEG is fully effective. However, with PEG MW 6000 although a much lower total concentration of PEG is effective, doubling the BSA concentration requires a ten-fold increase in PEG (at least at the lower concentrations).

The explanation for this behavior is not well understood at this time. However, this effect does indicate that until limiting viscosity is reached, a higher molecular weight polymer is probably preferred. In a real life laboratory testing situation it may not be possible to know in advance exactly what level of fouling agents are present. Therefore, it is desirable to prepare reagents that have a sufficiently high level of effectiveness to neutralize the worst possible expected fouling situation. Tests made along the lines of those presented in Table 1 make it fairly simple to determine the relative effectiveness of different polymers against various levels of fouling agents. In this way reagents having the lowest possible level of the most effective anti-fouling agents can be selected. That is, once tests have indicated that a particular sample or type of sample contains a fouling agent, it is possible to prepare a matrix of samples where a range of concentrations of a number of candidate hydrophilic polymers are added. Then the samples are analyzed using EWOD to determine which of the candidate polymers is most effective (i.e., effective at the lowest concentration) to overcome the fouling.

Some hydrophilic polymers appear to be ineffective even at the highest concentration tested. For example, Dextran polymer is available in a number of grades. Dextrans are used in medicine to coat platelets so it was expected that these polymers might be effective to mitigate fouling. Tests showed that droplets containing Dextran were driven normally in the test EWOD device. That is to say, while Dextran has coating properties, it does not itself act as a fouling agent. However, 20% by weight solutions of two different Dextran polymers (3,000 MW and 25,000 MW) were completely ineffective at preventing fouling by BSA. This is in spite of the fact that this weight percent is within the weight range that was highly effective with PEG polymers. At this point it is not conclusively known whether Dextran polymers are simply ineffective or whether the polymers tested had an insufficient number of effective monomers at the concentrations tested. With PEG it is clear that longer polymers (more monomer units) are considerably more effective. In the case of Dextran each monomer is much larger (a glucose molecule) than those of PEG (an ethylene glycol molecule). Therefore, it is possible that the tested Dextran polymers simply had an insufficient number of monomers (these results also suggest that sugars may be inherently less effective monomers in preventing fouling). However, it is believed that water-soluble Dextran may be insufficiently amphipathic to provide antifouling effects.

This surmise is consistent with the discovery that hydrophilic polymers with significant surfactant properties show the most significant antifouling properties. An experiment was conducted to discover how effective poly sorbate (polyoxyethylene sorbitan monooleate or Tween-20®) is at preventing the fouling effect of BSA. The experiment was identical to the BSA experiments already presented. The test was conducted with 300 µg/ml BSA solution. It was found that only 0.01% wt./v of the polysorbate surfactant was sufficient to overcome the fouling effect of this amount of BSA. This is a 100 fold improvement over PEG which shows weaker surfactant properties. With lower concentrations of BSA this surfactant appears to be even more effective. With 200 µg/ml BSA solution only 0.005% wt./v was required which is a 200 fold improvement over PEG. It is anticipated that higher molecular weigh surfactants with similar chemical structures (e.g. Tween-80®) will be even more effective. When polyoxyethylene octyl phenyl ether (Triton X-100®), another surfactant, was tested in parallel to the polyoxyethylene sorbitan monooleate, it was also found to be much more effective than PEG. For a 300 µg/ml BSA solution only about 0.005% wt./v is required to avoid fouling effects.

However, not all hydrophilic polymers are effective. For example, tests have shown that polyvinyl alcohol (PVA) itself is an extremely effective fouling agent. The PVA used had an average between MW 60-100,000. Addition of PVA to the test droplet made it impossible to move the droplet by EWOD even in the absence of BSA. PVA is known to have significant film forming properties; it seems likely that PVA coats the EWOD surfaces and prevents any changes in surface tension. It is possible that a smaller polymer might not be a fouling agent and might actually be an anti-fouling agent. In other words, it is possible that when the hydrophilic polymers become too large, they become fouling agents rather than anti-fouling agents.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method of transporting a sample droplet by electrowetting on an electrowetting-on-dielectric (EWOD) surface in a microfluidic device, the method comprising:
    (a) providing a sample droplet on the EWOD surface comprising:
        (i) a sample;
        (ii) a hydrophilic polymer additive; and
        (iii) a component which in the absence of the hydrophilic polymer additive would cause the sample droplet to fail to be transported by electrowetting on the EWOD surface; and
    (b) transporting the sample droplet by electrowetting on the EWOD surface, wherein in the absence of the hydrophilic polymer, the droplet would fail to be transported.

2. The method according to claim 1, wherein the hydrophilic polymer additive comprises a nonionic surfactant.

3. The method according to claim 2, wherein the nonionic surfactant is selected from the group consisting of polyethylene glycol and methoxypolyethylene glycol.

4. A method of conducting droplet transport by electrowetting-on-dielectric (EWOD), the method comprising:
    (a) providing an EWOD surface and a droplet on the EWOD surface, the droplet comprising a fouling agent and a quantity of hydrophilic polymer effective to prevent EWOD surface adsorption of the fouling agent and thereby permit transport of a droplet that would not be transportable in the absence of the hydrophilic polymer; and
    (b) transporting the droplet by electrowetting on the EWOD surface.

5. The method of claim 4 wherein the droplet comprises a sample.

6. The method of claim 4 wherein the droplet comprises a biological sample.

7. The method of claim 4 wherein the droplet comprises a diagnostic sample.

8. The method of claim 4 wherein the fouling agent comprises a globular protein.

9. The method of claim 4 wherein the fouling agent comprises albumin.

10. The method of claim 4 wherein the hydrophilic polymer exhibits surfactant properties.

11. The method of claim 4 wherein the hydrophilic polymer comprises polyethylene glycol.

12. The method of claim 4 wherein the hydrophilic polymer is non-fouling.

13. The method of claim 4 wherein the hydrophilic polymer is amphipathic.

14. The method according to claim 4, wherein the hydrophilic polymer comprises a nonionic surfactant.

15. The method according to claim 14, wherein the nonionic surfactant is selected from the group consisting of polyethylene glycol and methoxypolyethylene glycol.

* * * * *